(12) United States Patent
Ii

(10) Patent No.: US 7,602,973 B2
(45) Date of Patent: Oct. 13, 2009

(54) IMAGE PROCESSING APPARATUS, PROGRAM, RECORDING MEDIUM, AND IMAGE EDITING METHOD

(75) Inventor: Yasuhiro Ii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 724 days.

(21) Appl. No.: 10/735,151

(22) Filed: Dec. 12, 2003

(65) Prior Publication Data
US 2004/0179740 A1  Sep. 16, 2004

(30) Foreign Application Priority Data
Dec. 13, 2002  (JP) .............................. 2002-361797

(51) Int. Cl.
*G06K 9/36* (2006.01)
*G06K 9/46* (2006.01)
*G06K 9/32* (2006.01)

(52) U.S. Cl. ..................... 382/232; 382/248; 382/296; 382/298; 382/299

(58) Field of Classification Search ................. 382/232, 382/248, 296, 298, 299; 345/175, 156, 173
See application file for complete search history.

(56) References Cited

U.S. PATENT DOCUMENTS 5,892,509 A * 4/1999 Jakobs et al. ................ 715/751
6,321,231 B1 * 11/2001 Jebens et al. ............. 707/104.1
6,424,385 B1 * 7/2002 Koyama et al. ............. 348/734
6,522,418 B2 * 2/2003 Yokomizo et al. .......... 358/1.15
2002/0029242 A1 * 3/2002 Seto ........................... 709/203

FOREIGN PATENT DOCUMENTS

JP   2000-067220   3/2000
JP   2000-307627   11/2000

* cited by examiner

*Primary Examiner*—John B Strege
(74) *Attorney, Agent, or Firm*—Blakely, Sokoloff, Taylor & Zafman LLP

(57) ABSTRACT

An image processing apparatus includes a first image editing unit, an informing unit, a job supplying unit, and a second image editing unit. The first image editing unit edits a low resolution part of an image in response to a command from another image processing apparatus commanding to conduct an image editing process. The informing unit informs the other image processing apparatus that the image editing process has been completed by the first image editing unit. The job supplying unit supplies a job commanding a high resolution part of the image to be edited. The second image editing unit asynchronously edits the high resolution part of the image at a prescribed time in response to the job supplied from the job supplying unit. The image processing apparatus and the other image processing apparatus may be connected via a network.

11 Claims, 13 Drawing Sheets

0LL
(ORIGINAL IMAGE TILE)

DECOMPOSITION LEVEL 0

DECOMPOSITION LEVEL 1

DECOMPOSITION LEVEL 2

DECOMPOSITION LEVEL 3

FIG.10

| SOC | MH | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 50 | 51 | 52 | 53 | 54 | EOC |

IMAGE PROCESSING APPARATUS, PROGRAM, RECORDING MEDIUM, AND IMAGE EDITING METHOD

The present application claims priority to the corresponding Japanese Application No. 2002-361797, filed on Dec. 13, 2002, the entire contents of which are hereby incorporated by reference.

BACKGROUND OF THE INVENTION

1. Field of the Invention

The present invention relates to an image processing apparatus, a program, a recording medium, and an image editing method.

2. Description of the Related Art

Conventionally, as is described below, there are two types of processes that are commonly performed for displaying/editing electronic documents and images in a server-client electronic document management system or a server-client image management system.

With the first type, an image managed by a server computer is transmitted in the form of encoded data to a client computer so as to be decoded and displayed in the client computer. In the client computer, the image is subjected to an image editing process (e.g., rotating or flipping of the image), and the edited image is encoded and transmitted to the server computer in the form of encoded data, thereby replacing the image (encoded data) managed in the server computer.

With the second type, an image managed by a server computer is transmitted in the form of encoded data to a client computer to be decoded and displayed in the client computer. The image editing process (e.g. rotating or flipping of the image) is performed on the image by sending an editing command from the client computer to the server computer. That is, the sequential processes of decoding→editing (rotating/flipping)→encoding is performed in the server computer in response to the editing command sent from the client computer.

The above-described two types are often used separately depending on the editing purpose. For example, complicated image editing processes such as cutting-out a portion of an image or cutting & pasting of another image are often performed in the client computer as described in the first type. In a case where an image editing process involving the entire image (e.g. rotating) is performed at once on a plurality of images, the image editing process is often performed in the server computer as described in the second type.

In order to fulfill the recent needs for enhancing performance and increasing functions in image compression/decompression technology, JPEG 2000, which is a new image compression format capable of decoding high-grade images even under high compression rates, is being standardized. With JPEG 2000, compression/decompression can be accomplished even under limited memory conditions by dividing images into rectangular areas (tiles). That is, each tile serves as a basic unit for performing compression/decompression where the compression/decompression can be performed on each tile independently.

The JPEG 2000, however, has a complicated algorithm, and requires longer time in encoding and decoding compared to the conventional JPEG.

Processing time is, particularly, a factor that cannot be ignored when performing an image editing process (e.g., rotating) entirely to a plurality of images.

In JPEG 2000, only the tiles, which have been renewed in editing a portion of an image, need to be replaced since compression/decompression can be performed independently on each tile, thereby allowing processing time to be reduced. However, when a plurality of images are to be subjected to an image editing process (e.g., flipping of an entire image) requiring renewal of an entire image, processing time cannot be reduced merely by dividing images into tiles since the entire image is to be replaced.

SUMMARY OF THE INVENTION

An image processing apparatus, program, recording medium, and image editing method are described. In one embodiment, the image processing apparatus comprises a first image editing unit to edit a low resolution part of an image in response to a command from another image processing apparatus commanding to conduct an image editing process, an informing unit to inform the other image processing apparatus that the image editing process has been completed by the first image editing unit, a job supplying unit to supply a job commanding a high resolution part of the image to be edited, and a second image editing unit to asynchronously edit the high resolution part of the image at a prescribed time in response to the job supplied from the job supplying unit.

BRIEF DESCRIPTION OF THE DRAWINGS

FIG. 10 is an explanatory view showing a compressed code according to a divided image in compliance with a JPEG 2000 algorithm;

DESCRIPTION OF THE PREFERRED EMBODIMENTS

Figure 1:
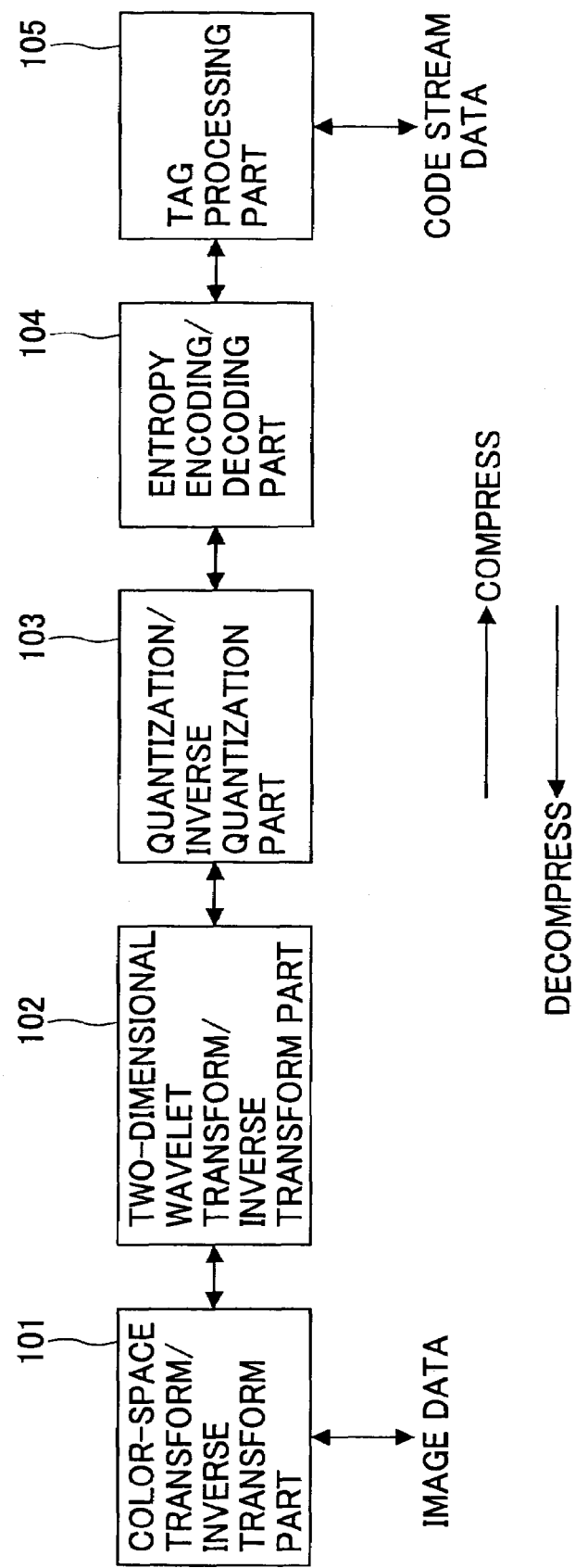
FIG. 1 is a block diagram showing the functions of a system executing a hierarchical coding algorithm serving as a base of a JPEG 2000 format which is a basic premise of the present invention.

Embodiments of the present invention comprise an image processing apparatus, a program, a recording medium, and an image editing method that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Embodiments of the present invention will be realized and attained by an image processing apparatus, a program, a recording medium, and an image editing method particularly pointed out in the specification in such full, clear, concise, and exact terms as to enable a person having ordinary skill in the art to practice the invention.

To achieve these and other advantages and in accordance with the purpose of the invention, as embodied and broadly described herein, one embodiment of an image processing apparatus that includes: a first image editing unit to edit a low resolution part of an image in response to a command from another image processing apparatus commanding to conduct an image editing process; an informing unit to inform the other image processing apparatus that the image editing process has been completed by the first image editing unit; a job supplying unit to supply a job commanding a high resolution part of the image to be edited; and a second image editing unit to asynchronously edit the high resolution part of the image at a prescribed time in response to the job supplied from the job supplying unit. Further, according to one embodiment of the present invention, the image processing apparatus and the other image processing apparatus may be connected via a network.

In an embodiment of the present invention, upon receipt of an image editing command from another image processing apparatus, a low resolution part of an image is edited in accordance with the image editing command. Subsequent to the editing, the other image processing apparatus is informed that the editing is completed. An editing operation of a high resolution part of the image is performed asynchronously at a prescribed timing (e.g. during the night). Since the image editing operation of the low resolution part of the image, having, for example, a relatively small amount of data, can be performed in a shorter time compared to editing a whole image, the image editing operation may be performed faster than a conventional image editing operation. Therefore, waiting time in an image editing operation can be shortened for the user.

In one embodiment of the image processing apparatus, when the other image forming apparatus commands the image to be displayed, encoded data of the edited low resolution part of the image may be transmitted to the other image processing apparatus.

In one embodiment of the present invention, since the image editing operation of the image requested from the other image processing apparatus can be applied at least to the low resolution part of the image, the transmittal of encoded data of the low resolution part ensures the edited image (at least the low resolution portion of the image) to be transmitted to the other image processing apparatus.

In one embodiment of the image processing apparatus, when the other image processing apparatus commands a portion of the high resolution part of the image to be displayed in a case where the second image editing unit has not completed editing the high resolution part of the image, the portion of the high resolution part of the image may be edited, and the edited portion of the high resolution part of the image may be encoded and transmitted to the other image processing apparatus.

For example, in a case where a display of a whole image using the low resolution part is switched to a partial image using the high resolution part, there will be no inconsistency between the displayed images.

In one embodiment of the image processing apparatus, the other image processing apparatus may be informed that the portion of the high resolution part of the image cannot be displayed when the image editing process that is being conducted is an image editing process that cannot be conducted on a portion-by-portion basis.

In one embodiment of the present invention, an operation of displaying a part of an image can be restrained in a case, for example, where an image editing operation (e.g. skew correction) that cannot be conducted on a tile-by-tile basis (portion by portion basis) is being performed.

In one embodiment of the image processing apparatus, when the other image processing apparatus commands a printing process to be conducted for the image including the high resolution part of the image, in a case where the second image editing unit has not completed editing the high resolution part of the image, the other image processing apparatus may be informed that the printing process cannot be conducted.

In one embodiment of the present invention, in a case where a printing operation using the high resolution part of the image is conducted based on a displayed image using the low resolution part of the image, there will be no inconsistency between the displayed image and the printed image.

Furthermore, one embodiment of the present invention comprises an image editing method including the steps of: a) editing a low resolution part of an image in response to a command from another image processing apparatus commanding to conduct an image editing process; b) informing the other image processing apparatus that the image editing process has been completed in step a); c) supplying a job commanding a high resolution part of the image to be edited; and d) editing the high resolution part of the image asynchronously at a prescribed time in response to the job supplied in step c). Further, in the image processing method according to one embodiment of the present invention, the image processing apparatus and the other image processing apparatus may be connected via a network.

In one embodiment of the present invention, upon receipt of an image editing command from another image processing apparatus, a low resolution part of an image is edited in accordance with the image editing command. Subsequent to the editing, the other image processing apparatus is informed that the editing is completed. An editing operation of a high resolution part of the image is performed asynchronously at a prescribed timing (e.g., during the night). Since the image editing operation of the low resolution part of the image, having, for example, a relatively small amount of data, can be performed in a shorter time compared to editing a whole image, the image editing operation may be performed faster than a conventional image editing operation. Therefore, waiting time in an image editing operation can be shortened for the user.

Furthermore, one embodiment of the present invention comprises a program to be installed or executed by a computer having an image processing apparatus. The image processing apparatus is in communication with another image processing apparatus. The program includes: a first image editing function of editing a low resolution part of an image in response to a command from the other image processing apparatus commanding to conduct an image editing process; an informing function of informing the other image processing apparatus that the image editing process has been completed by the first image editing function; a job supplying function of supplying a job commanding a high resolution part of the image to be edited; and a second image editing function of asynchronously editing the high resolution part of the image at a prescribed time in response to the job supplied from the job supplying function. Further, in the program according to one embodiment of the present invention, the image processing apparatus and the other image processing apparatus may be connected via a network.

In one embodiment of the present invention, upon receipt of an image editing command from another image processing apparatus, a low resolution part of an image is edited in accordance with the image editing command. Subsequent to the editing, the other image processing apparatus is informed that the editing is completed. An editing operation of a high resolution part of the image is performed asynchronously at a prescribed timing (e.g., during the night). Since the image editing operation of the low resolution part of the image, having, for example, a relatively small amount of data, can be performed in a shorter time compared to editing a whole image, the image editing operation may be performed faster than a conventional image editing operation. Therefore, waiting time in an image editing operation can be shortened for the user.

In one embodiment of the program, when the other image forming apparatus commands the image to be displayed, encoded data of the edited low resolution part of the image may be transmitted to the other image processing apparatus.

In one embodiment of the present invention, since the image editing operation of the image requested from the other image processing apparatus can be applied at least to the low resolution part of the image, the transmittal of encoded data of the low resolution part ensures the edited image (at least the low resolution portion of the image) to be transmitted to the other image processing apparatus.

In one embodiment of the program, when the other image processing apparatus commands a portion of the high resolution part of the image to be displayed in a case where the second image editing function has not completed editing the high resolution part of the image, the portion of the high resolution part of the image may be edited, and the edited portion of the high resolution part of the image may be encoded and transmitted to the other image processing apparatus.

For example, in a case where a display of a whole image using the low resolution part is switched to a partial image using the high resolution part, there will be no inconsistency between the displayed images.

In one embodiment of the program, the other image processing apparatus may be informed that the portion of the high resolution part of the image cannot be displayed when the image editing process that is being conducted is an image editing process that cannot be conducted on a portion-by-portion basis.

In one embodiment of the present invention, an operation of displaying a part of an image can be restrained in a case, for example, where an image editing operation (e.g. skew correction) that cannot be conducted on a tile-by-tile basis (an image editing process which affects the whole image) is being performed.

In one embodiment of the program, when the other image processing apparatus commands a printing process to be conducted for the image including the high resolution part of the image, in a case where the second image editing function has not completed editing the high resolution part of the image, the other image processing apparatus may be informed that the printing process cannot be conducted.

In one embodiment of the present invention, in a case where a printing operation using the high resolution part of the image is conducted based on a displayed image using the low resolution part of the image, there will be no inconsistency between the displayed image and the printed image.

In one embodiment of the program, the program may be stored in a recording medium.

In one embodiment of the present invention, storing the program in a recording program, and installing the program in a computer or interpreting the program with a computer allows the foregoing functions of the present invention to be accomplished.

Other embodiments of the present invention will be apparent from the following detailed description when read in conjunction with the accompanying drawings.

In the following, embodiments of the present invention will be described with reference to the accompanying drawings.

First, an overall description of a hierarchical coding algorithm and a JPEG 2000 algorithm, which are basic premises of the present invention, is given below.

FIG. 1 is a block diagram showing blocks representing functions of a system executing a hierarchical coding algorithm that serves as a base for a JPEG 2000 scheme. The system includes functional blocks of: a color-space transform/inverse transform unit 101, a two-dimensional wavelet transform/inverse transform unit 102, a quantization/inverse quantization unit 103, an entropy encoding/decoding unit 104, and a tag processing unit 105.

In comparison with the conventional JPEG algorithm, one of the most significant differences is the method of transformation. While a DCT (Discrete Cosine Transform) method is applied to the conventional JPEG, a DWT (Discrete Wavelet Transform) method is applied to the hierarchical encoding algorithm in the two-dimensional wavelet transform/inverse transform unit 102. The DWT method, in comparison with the DCT method, is advantageous in that high quality images can be provided in areas compressed at high levels. This is one major reason in employing the DWT method for the JPEG 2000 algorithm that serves as a successor of the JPEG algorithm.

As another significant difference, a functional block referred to as the "tag processing unit 105" is added to the hierarchical encoding algorithm for executing code formation at the final stage of the system. In the tag processing unit 105, compressed data is generated in a form of code stream data during an image compression operation, and code stream data required to be decompressed is interpreted during a decompression operation. By using the code stream data, the JPEG 2000 is able to provide a variety of useful functions. For example, a compression/decompression operation can be terminated, on a block basis, at an arbitrary level (decomposition level) according to a level with respect to octave separation of DWT (Refer to FIG. 3 described below). This allows a low resolution part (size-reduced image) to be extracted from a file. Furthermore, a part of an image (tiling image) can also be extracted.

In many cases, the color-space transform/inverse transform unit 101 is connected to an input/output unit for an original image. The color-space transform/inverse transform unit 101 performs color-space transformation/inverse transformation, for example, transformation/inverse transformation from an RGB color expression system (comprising primary color components of Red (R), Green (G), and Blue (B)) or a YMC color expression system (comprising complementary color components of Yellow (Y), Magenta (M), and Cyan (C)) to a YUV or YCbCr color expression system.

Next, a JPEG 2000 algorithm is described in detail below.

Figure 2:
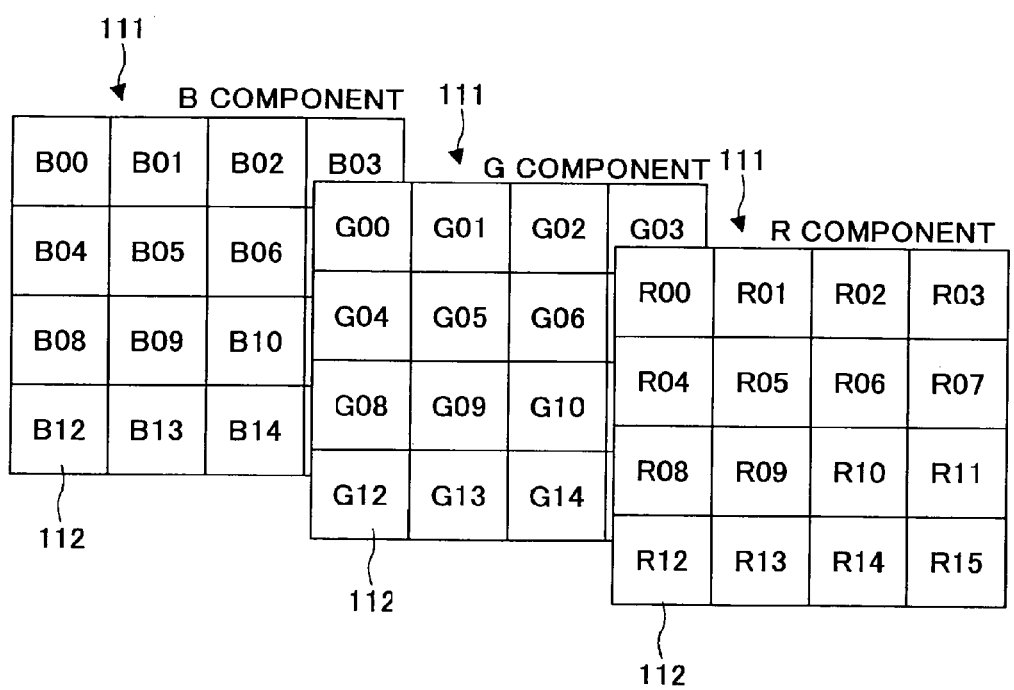
FIG. 2 is an explanatory view showing respective components of an original image divided into rectangular areas.
Figure 3A:
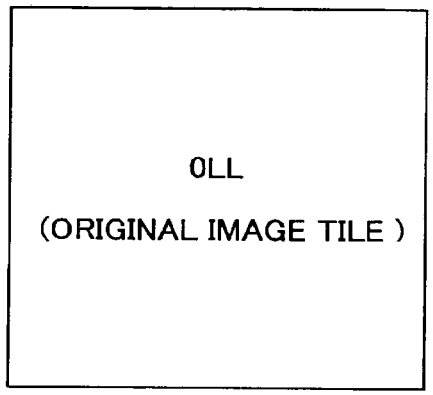
FIGS. 3A to 3D are explanatory views showing sub-bands for each decomposition level in a case where the number of decomposition levels is 3.
Figure 3B:
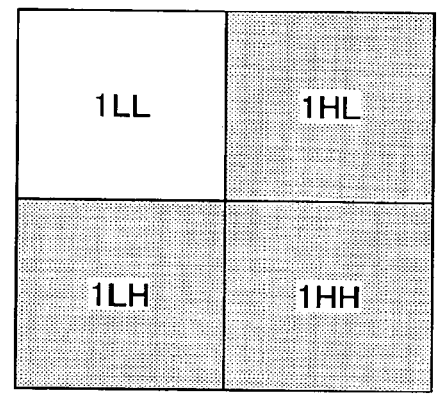
Figure 3C:
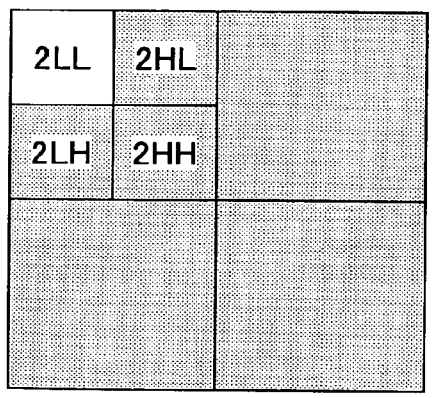
Figure 3D:
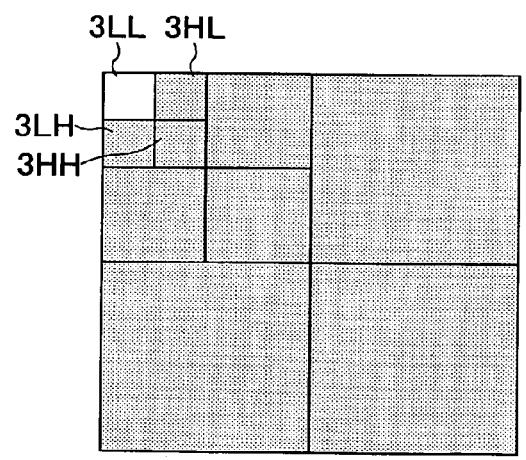

In terms of color images, each of the components (in this embodiment, the components of an RGB color expression system) of an original image 111 is divided, generally, into rectangular areas in a manner shown in FIG. 2. Although the rectangular areas are typically referred to as "blocks" or "tiles," since the rectangular areas are normally referred to as "tiles" under the JPEG 2000 standard, the rectangular areas will hereinafter be referred to as "tiles." (In the example shown in FIG. 2, each component 111 is divided vertically and horizontally into 4×4 tiles, so that tile 112 is a total of 16 tiles). Each of the tiles 112 (in the example shown in FIG. 2, R00, R01, . . . , R15/G00, G01, . . . , G15/B00, B01, . . . , B15) serves as a basic unit to which an image data compression/decompression operation is performed. Therefore, the image data compression/decompression operation is performed independently for each component 111 and each tile 112.

In an image data encoding operation, image data of each tile 112 of each component 111 is input to the color-space conversion/inverse conversion unit 101 (see FIG. 1), at which color-space transformation is performed. Subsequent to the color-space transformation, the image data is subjected to two-dimensional wavelet transformation in the two-dimensional wavelet transform/inverse transform unit 101, and is spatially divided into frequency bands.

FIG. 3 shows sub-bands in each decomposition level in a case where the number of decomposition levels is 3. That is, an original image tile (0LL) on decomposition level 0 obtained by dividing the original image into tiles is subjected to two-dimensional wavelet transformation, and is divided into sub-bands 1LL, 1HL, 1LH, and 1HH on decomposition level 1. Then, the low frequency sub-band 1LL on decomposition level 1 is subjected to two-dimensional wavelet transformation, and is further divided into sub-bands 2LL, 2HL, 2LH, and 2HH on decomposition level 2. Similarly, the low frequency sub-band 2LL is subjected to two-dimensional wavelet transformation, and is further divided into sub-bands 3LL, 3HL, 3LH, and 3HH on decomposition level 3. The sub-bands that are to be encoded on each decomposition level are indicated with hatching in FIG. 3. For example, in a case where the number of decomposition levels is 3, the sub-bands indicated with the hatchings (3HL, 3LH, 3HH, 2HL, 2LH, 2HH, 1HL, 1LH, 1HH) will be subjected to encoding, while the sub-band 3LL will not be subjected to encoding.

Next, bits to be encoded are determined according to a predetermined encoding order, and then, a context is created in the quantization/inverse quantization unit 103 from bits in the periphery of the targeted bit.

Figure 4:
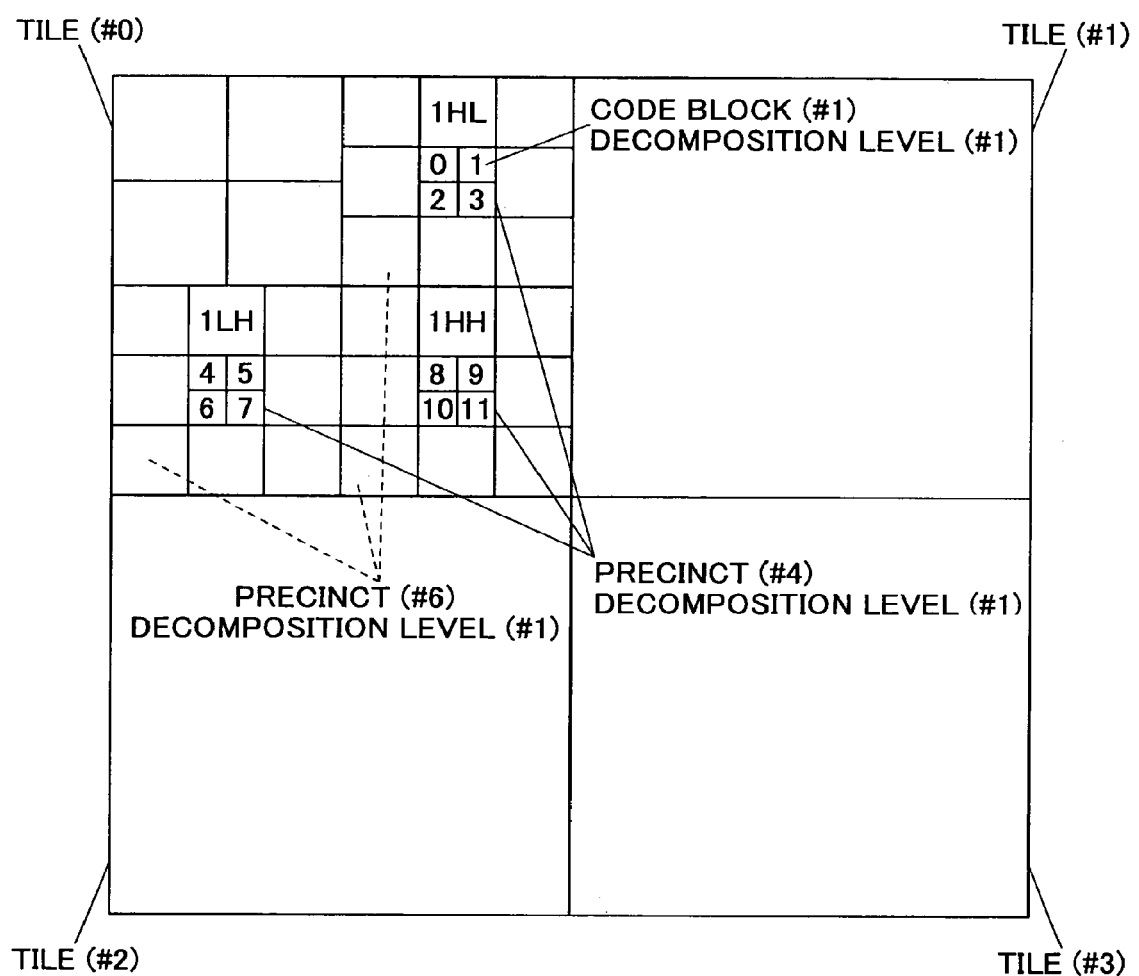
FIG. 4 is an explanatory view showing precincts.

Wavelet coefficients having undergone the quantization process are divided into non-overlapped rectangles referred to as "precincts" for each sub-band. This scheme is introduced in order to efficiently use memory during an implementation process. As shown in FIG. 4, each precinct is formed of three spatially consistent rectangular areas. Further, each precinct is divided into non-overlapped rectangular "code blocks". Each code block is used as a basic unit when entropy coding is performed.

The quantizing and encoding of the coefficient values may be performed immediately after the coefficient values have undergone wavelet transformation; however, in order to improve encoding efficiency, each of the coefficient values in the JPEG 2000 scheme may be decomposed into units of "bit planes" and the sequence of the bit planes may be determined according to each pixel or code block.

Figure 5:
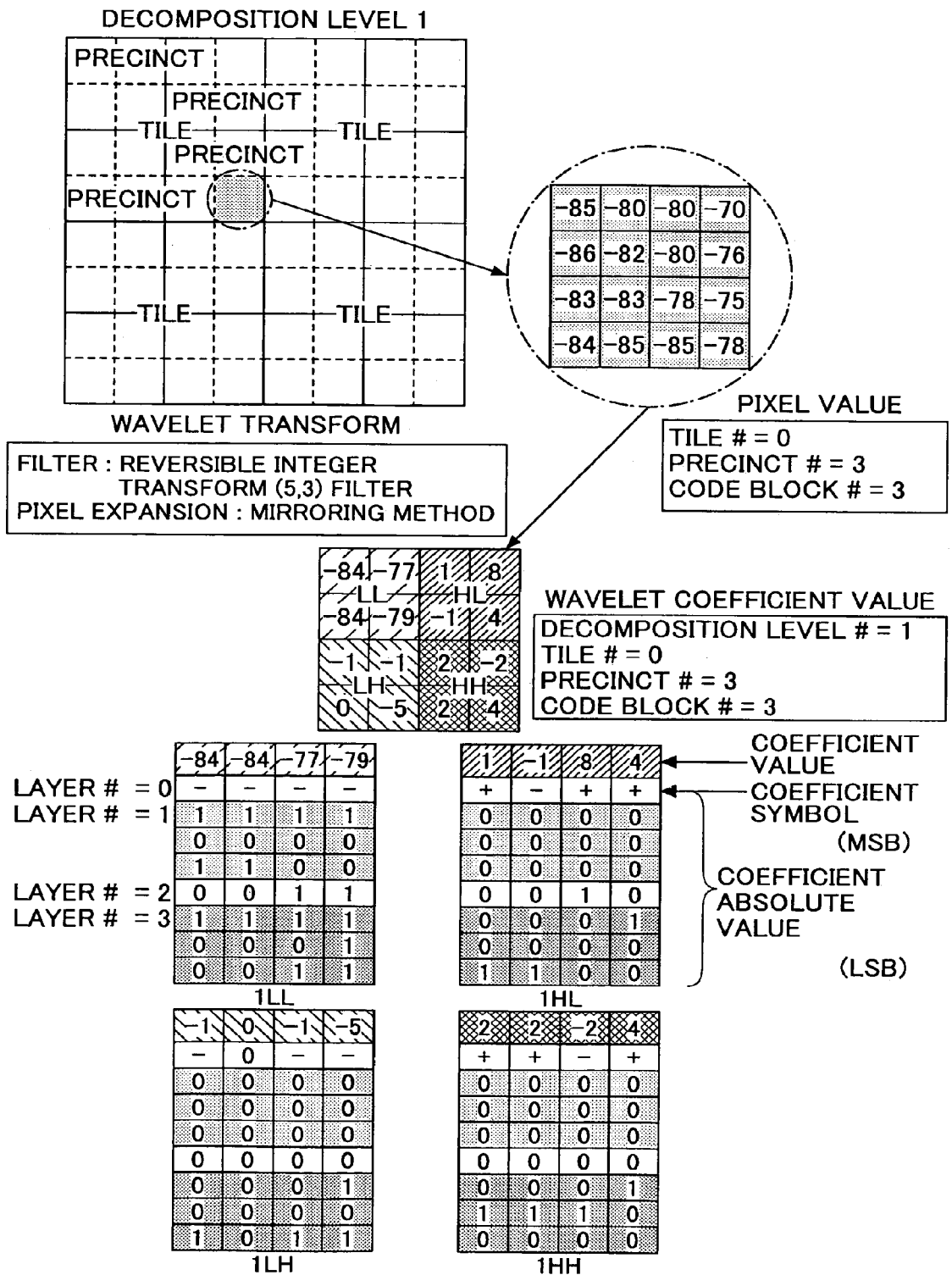
FIG. 5 is an explanatory view showing an example of a procedure of assigning the sequence of bit plane.

FIG. 5 is an explanatory view showing an example of a procedure of assigning the sequence of bit planes. The example in FIG. 5 shows an original image (32×32 pixels) divided into four tiles of 16×16 pixels, in which the sizes of the precincts and the code blocks on decomposition level 1 are 8×8 pixels, and 4×4 pixels, respectively.

The precincts and the code blocks are assigned with numbers in raster order. In this example, the precincts are assigned with numbers 0 through 3, and the code blocks are assigned with numbers 0 through 3. In expanding pixels beyond the tile boundaries, a mirroring method is employed, and wavelet transformation is performed with a reversible Le Gall 5-tap/3-tap filter, to thereby obtain the wavelet coefficient value on decomposition level 1.

Furthermore, FIG. 5 also shows an example of a representative layer structure with respect to tile 0/precinct 3/code block 3. In the example, the code block having undergone wavelet transformation is divided into sub-bands (1LL, 1HL, 1LH, 1HH), and each of the sub-bands is assigned with wavelet coefficient values.

The layer structure is relatively easy to understand when the wavelet coefficient values are viewed from the side (bit-plane direction). In this example, layer # 0, 1, 2, and 3 are formed of bit-planes of 1, 3, 1, and 3, respectively. A layer is more likely to be quantized when a bit-plane included therein is more close to the LSB (Least Significant Bit). On the other hand, a layer is less likely to be subjected to quantizing when a bit-plane included therein is more close to the MSB (Most Significant Bit), and therefore will remain free from quantizing until further on. The method of removing a layer that is close to LSB is referred to as "truncation", in which the method enables quantizing rates to be controlled accurately.

In the entropy encoding/decoding unit 104 shown in FIG. 1, encoding is performed on the tiles 112 of each component 111 based on a probability estimation technique from the contexts and targeted bits. Accordingly, the encoding process is performed on all of the components 111 of the original image on a tile 112 basis. Finally, in the tag processing unit 5, all of the encoded data from the entropy encoding/decoding unit 104 is formed into a single code stream data, and a tag is attached to the code stream data.

Figure 6:
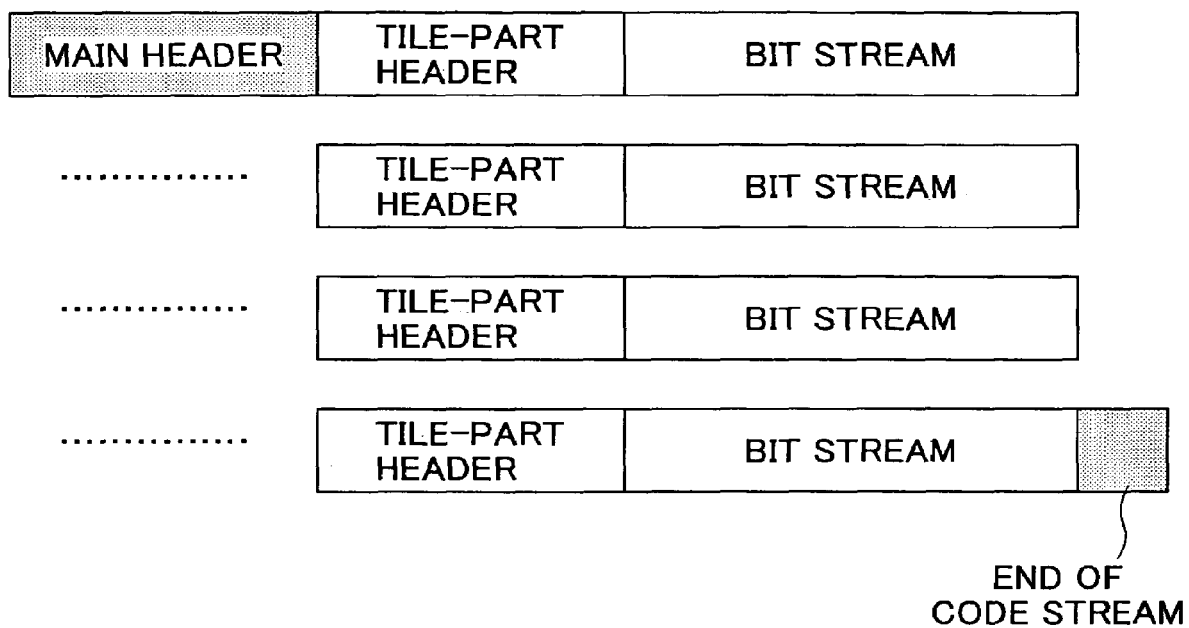
FIG. 6 is an explanatory view showing a schematic structure of code stream data for a single frame.

A structure of the code stream data for a single frame is schematically shown in FIG. 6. Tags (tag information) called headers (including a main header and tile part headers) is attached to the head of the code stream, and the head of each tile-part. Subsequent to the attachment of the headers, the encoded data (bit stream) for each tile is attached. It is to be noted that encoding parameters and quantizing parameters are written in the main header. Then again, a tag (end of code stream) is attached at the end of the code stream data.

The operation of decoding encoded data is, on the other hand, conducted inversely with respect to the operation of encoding image data, in which image data is produced from a code stream of each tile 112 of each component 111. In this case, the tag processing unit 105 interprets the tag information attached to the code stream input from the exterior, then the code stream is decomposed into code streams for each tile 112 of each component 111, and then decode processing (decompression) is performed for every code stream of each tile 112 of each component 111. Along with determining the positions of bits that are targeted for decoding in accordance with the sequence based on the tag information in the code stream, the context is produced from the arrangement of peripheral bits (already decoded) in the quantization/inverse quantization unit 103. In the entropy encoding/decoding unit 104, decoding is performed by probability estimation according to the code stream and the contexts, to thereby reproduce the targeted bits. The targeted bits are disposed at the relevant pixel position. Accordingly, since the decoded data is spatially divided into respective frequency bands (sub-bands), each tile of each component of the image data is restored by performing a two-dimensional wavelet inverse transformation in the two-dimensional wavelet inverse transform unit 102. The obtained restored data is transformed into image data of the original color system by the color space transform/inverse transform unit 101.

Next, an embodiment according to one embodiment of the present invention is described below. Although an example of JPEG 2000, which serves as a representative example of compressing/decompressing images, is described below, it is to be noted that the present invention is not to be limited to such description.

The server computer and the client computer of one embodiment of the present invention perform image processing in accordance with a program that is installed therein or interpreted thereby. In the present embodiment, a recording medium having the program recorded thereto will also be described below.

Figure 7:
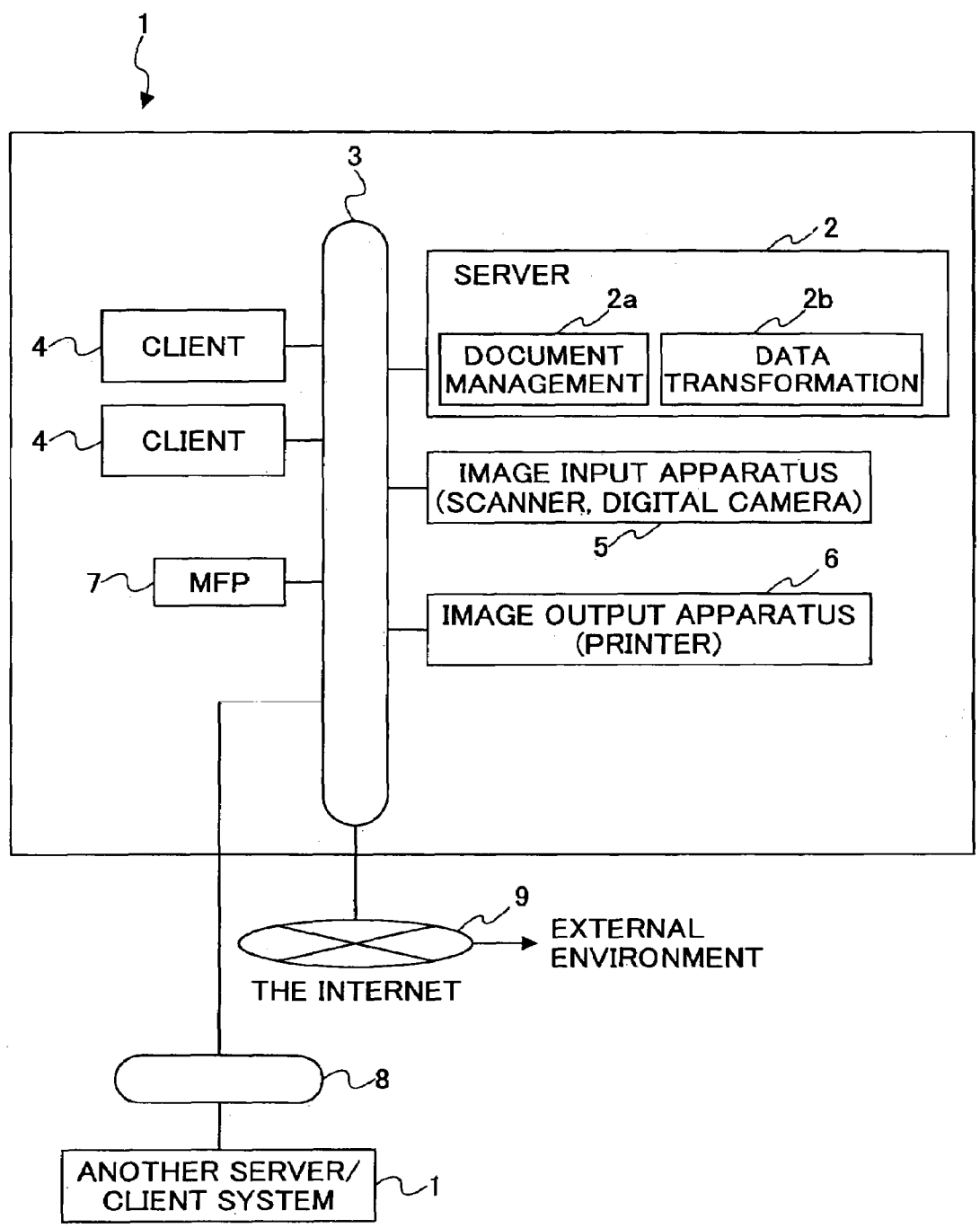
FIG. 7 is a schematic view showing an example of a system structure according to one embodiment of the present invention.

FIG. 7 is a schematic view showing an example of an image data processing system structure in one embodiment of the present invention.

The image data processing system according to an embodiment of the present invention assumes a server/client system 1, in which a server computer 2 (image processing apparatus) is connected to plural client computers 4 (other image processing apparatuses) via a network 3 such as LAN (Local Area Network). The server/client system 1 is comprised of an environment that is able to share an image input device 5 (e.g. scanner, digital camera) and an image output device 6 (printer) via the network 3. The network 3 may be comprised of a multi-function peripheral (MFP) 7, in which the MFP 7 may function as the image input device 5 and/or the image output device 6.

The server/client system 1 is established to be able to perform, for example, data communication with another server/client system 1 via an intranet 8, and also perform data communication with the external environment via the Internet 9.

The server computer 2 includes a document management server 2a and a data transform server 2b. The document management server 2a executes a document management function in which images of respective documents are stored as image data. The data transform server 2b, for example, executes a data transform function such as extracting text data by performing an OCR (Optical Character Reader) process to image data.

Figure 8:
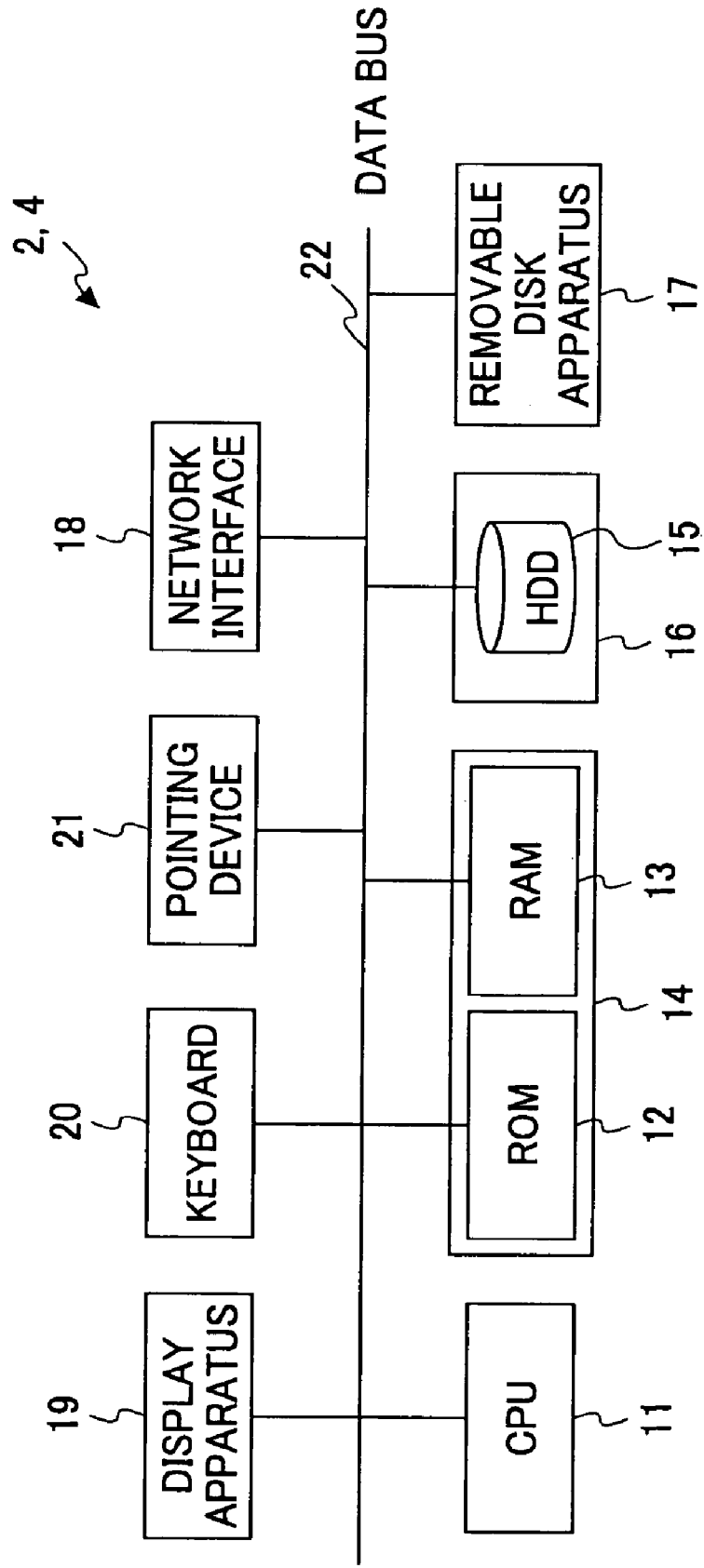
FIG. 8 is a schematic view of a module of an image processing apparatus.

FIG. 8 shows a module structure of the server computer 2 and the client computer 4, each of which serves as an image processing apparatus, according to an embodiment of the present invention.

The server computer 2 and the client computer 4 both include, for example: a CPU (Central Processing Unit) for processing information; a first memory unit 14 such as a ROM (Read Only Memory) 12 for storing information and/or a RAM (Random Access Memory) 13; a second memory unit 16 such as a HDD (Hard Disk Drive) 15 serving as a memory unit for storing compressed codes (described in detail below); a removable disk unit 17 such as a CD-ROM disk drive for storing information, for distributing information outside, and/or for importing information from outside; a network interface 18 for transmitting information by external computers via the network 3; a display unit 19 such as a CRT (Cathode Ray Tube) or an LCD (Liquid Crystal Display) for displaying processing status and/or results to the operator; a keyboard 20 for allowing the operator to input commands and/or information to the CPU 11; and a pointing device 21 such as a mouse. A data bus (bus controller) 22 serves to mediate the data transmitted between each of the above-given components.

Figure 9:
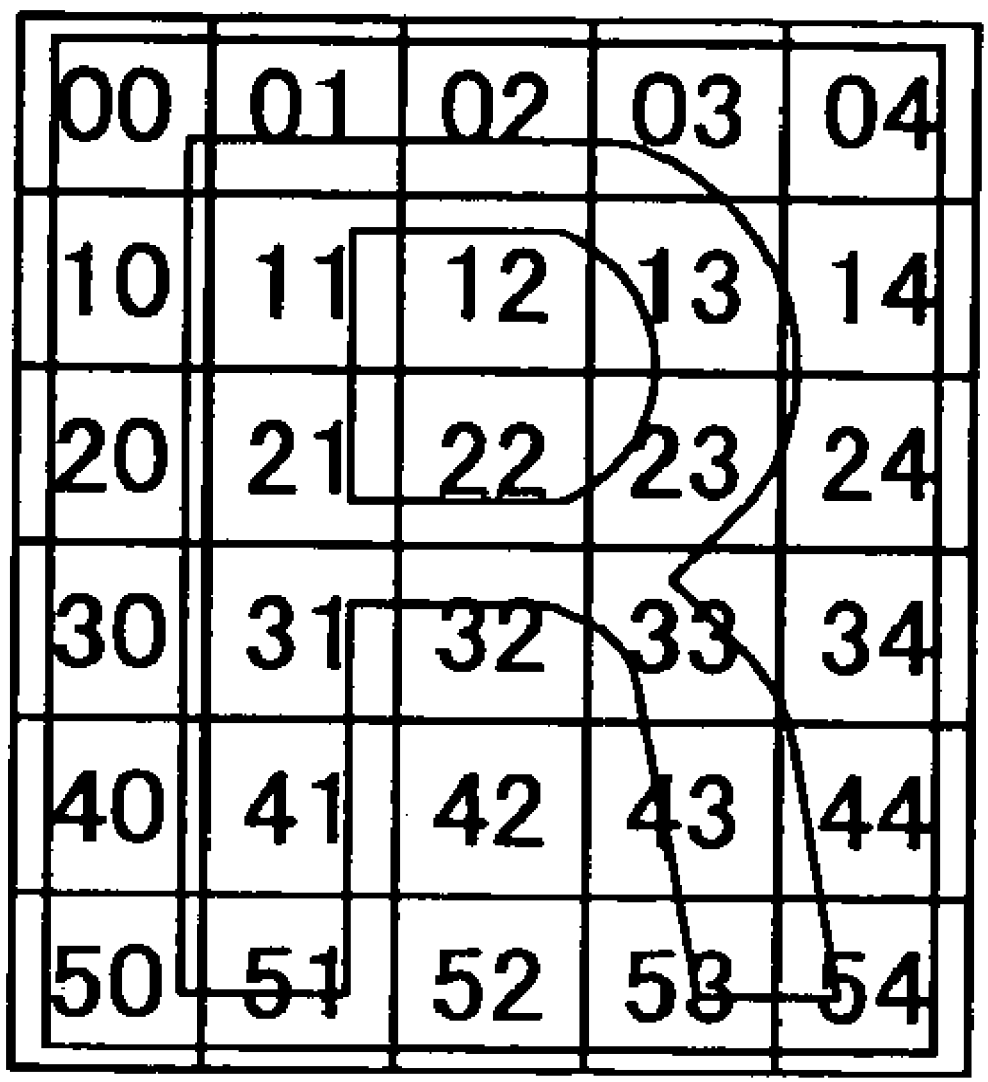
FIG. 9 is an explanatory view showing an example of an image that is divided two-dimensionally.

In one embodiment of the present invention, the compressed encoded image data is stored in the HDD 15 of the client computer 4. It is to be noted that the image data stored in the HDD 15 of the client computer 4 is compressed data generated in compliance with the JPEG 2000 algorithm. More specifically, the compressed data is formed as a one-dimensional alignment as shown in FIG. 10 by compressing and encoding images divided into rectangular regions (tiles) as shown in FIG. 9. In FIG. 10, SOC is a marker segment indicating the start of a code stream. Furthermore, MH is a main header that stores a value that is common to the entire code stream. For example, the amount of vertical tiles, the amount of horizontal tiles, the amount of horizontal images, and the amount of vertical images are recorded to the main header as the value common to the entire code stream. The data that follows MH is encoded data for each tile. In FIG. 10, compressed data for each tile is arranged in a main scanning direction/sub-scanning direction in accordance with tile numbers as shown in FIG. 9. The EOC marker at the end of the code stream is a marker segment indicating the end of the code stream.

Figure 11:
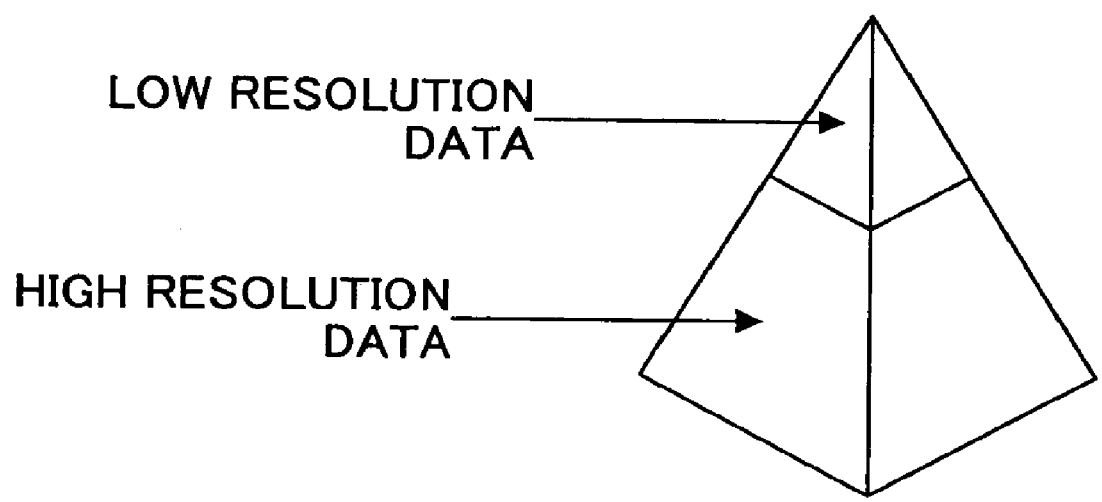
FIG. 11 is an explanatory view showing a resolution model of compressed code generated in accordance with the JPEG 2000 algorithm.

FIG. 11 is an explanatory view showing a resolution model for compressed data generated in accordance with the JPEG 2000 algorithm. The compressed data generated in accordance with the JPEG 2000 algorithm can be separated into low resolution data and high resolution data, inside an image file (see FIG. 11). It is to be noted that, although merely two kinds of resolutions are indicated in FIG. 11, it is also possible to provide a plurality of low resolution parts on a given level (decomposition level) according to octave separation of DWT (e.g. $1/2, 1/4, 1/8, 1/16, \ldots, 1/2^n$) in a case where the entire data is 1.

In the server computer 2 and the client computer 4, when power is turned on by the operator, the CPU 11 activates a program referred to as a loader in the ROM 12, and the RAM 13 then reads an operating system program, which manages hardware and software in the computer, from the HDD 15, to thereby activate the operating system. The operating system serves to, for example, activate programs, read and/or store information according to the controls of the operator.

As representative examples of the operating system, Windows (Registered Trademark) and/or UNIX (Registered Trademark) are well known. The program running in the operating system is referred to as an application program.

Here, the server computer 2 and the client computer 4 store an image processing program in the HDD 15 as the application program. In this sense, the HDD 15 functions as a recording medium having the image processing program stored therein.

In general, the image processing program to be installed in the second memory unit 16 (e.g., HDD 15) of the server computer 2 and the client computer 4 is first recorded to an optic information recording medium (e.g., CD-ROM, DVD-ROM) or a magnetic medium (e.g., flexible disk), and is then installed to the second memory unit 16 (e.g., HDD 15). Therefore, a recording medium (e.g., an optic information recording medium such as a CD-ROM, a magnetic medium such as a flexible disk), which can be transported, may also be a recording medium having the image processing program stored therein. Further, the image processing program may, for example, be extracted from the external via the network interface 18, and installed in the second memory unit 16 (e.g., HDD 15).

In the server computer 2 and the client computer 4, the CPU 11, in accordance with the image processing program, performs various computing processes and controls each of the units included in the image processing apparatus. Among the various computing processes performed by the CPU 11 of the server computer 2 and the CPU 11 of the client computer 4, the characteristic processes of the present embodiment are described below.

Figure 12:
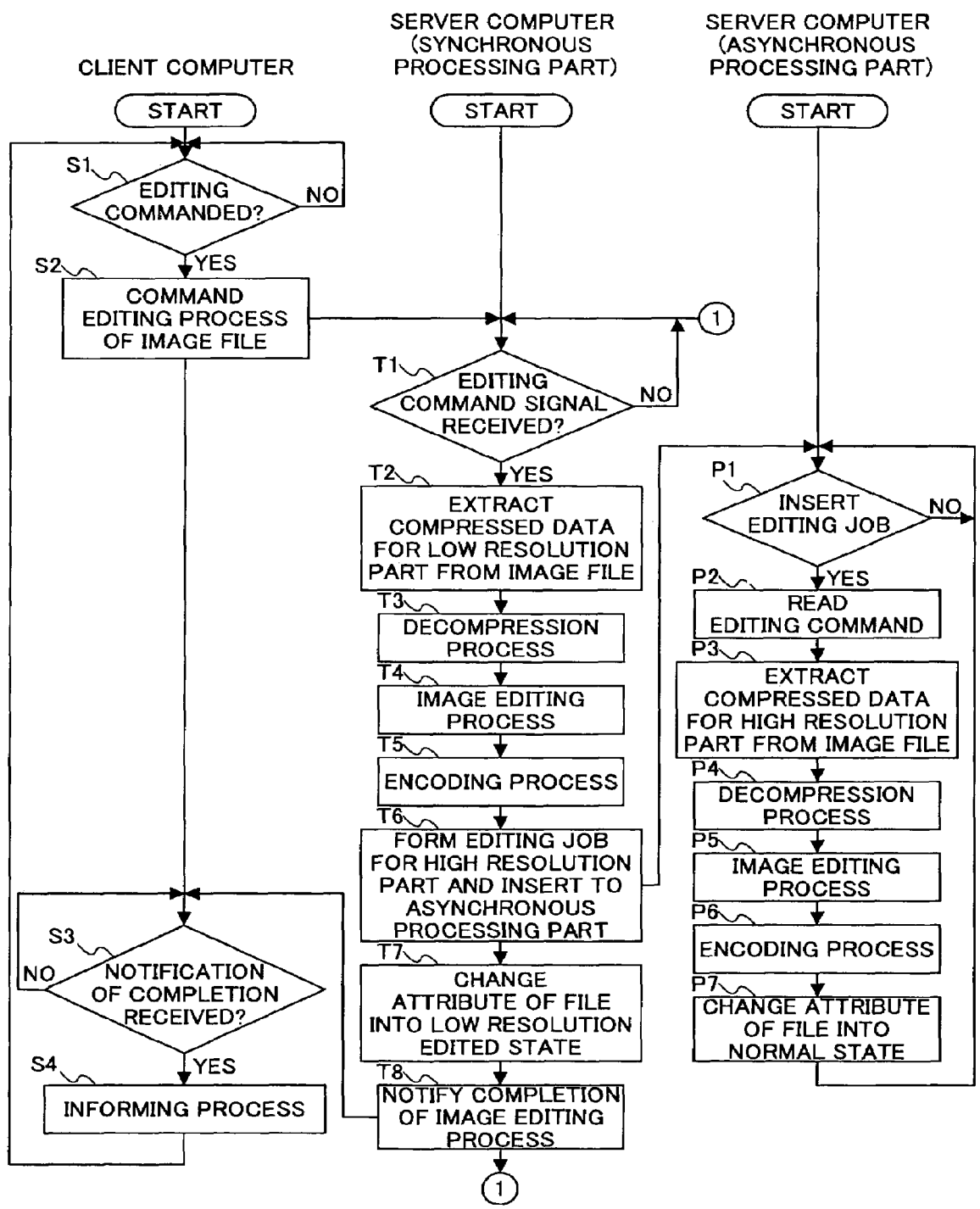
FIG. 12 is a flowchart showing a flow of an image editing process.

FIG. 12 is a flowchart showing the flow of an image editing process performed in accordance with the image processing program and communication between the server computer 2 (i.e. image processing apparatus) and the client computer 4 (i.e. image processing apparatus). With reference to FIG. 12, when an operator (a user operating the client computer 4), with use of the keyboard 20 or the pointing device 21, commands an image editing process (e.g. erasing, noise removal, or skew correction with respect to a rectangular region) for a prescribed image file ("YES" in Step S1), the client computer 4 issues a command to the server computer 2 to perform image editing processing of the image (Step S2).

Meanwhile, when the server computer 2 receives a signal commanding the editing of the image from the client computer 4 ("YES" in Step T1), compressed data corresponding to a low resolution part of the image is extracted from a prescribed image file stored in the HDD 15 (Step T2), and then, a decompression process (decoding process) is performed on the compressed data in accordance with the JPEG 2000 algorithm (Step S3). Here, the description of the decompression process (decoding process) according to the JPEG 2000 algorithm is omitted since it is described above in the description of the color-space transform/inverse transform unit 101, the two-dimensional wavelet transform/inverse transform unit 102, the quantization/inverse quantization unit 103, the entropy encoding/decoding unit 104, and the tag processing unit 105 shown in FIG. 1.

Then, after performing the image editing process (e.g. erasing, noise removal, or skew correction with respect to a rectangular region) to the image generated from the decompression process (Step T4), the CPU 11 of the server computer 2 performs an encoding process in accordance with the JPEG 2000 algorithm (Step T5). Here, the description of the encoding process according to the JPEG 2000 algorithm is omitted since it is described above in the description of the color-space transform/inverse transform unit 101, the two-dimensional wavelet transform/inverse transform unit 102, the quantization/inverse quantization unit 103, the entropy encoding/decoding unit 104, and the tag processing unit 105 shown in FIG. 1. At this stage, only the low resolution part of the image is subjected to the image editing process, that is, the high resolution part of the image is not subjected to the image editing process.

The server computer 2 includes a first editing unit that refers to that portion of the CPU 11 of the server computer 2 that performs the functions of the aforementioned steps T2 through T5.

The CPU 11 of the server computer 2 includes a job supplying unit that then forms an editing job for a high resolution part of the image, and inserts the editing job to an asynchronous unit of the server computer 2 (Step T6). The content of the editing job is the same as that of the command for performing the image editing process for the prescribed image file in Step S1 (e.g., erasing, noise removal, or skew correction with respect to a rectangular region).

Further, the CPU 11 of the server computer 2 changes an attribute of the image file included in the main header into a low resolution edited state (Step T7). The low resolution edited state is a state indicating that editing of the image file is prohibited except for editing with a particular authority. That is, the low resolution edited state is a state indicating that only the low resolution part has already been edited. Therefore, the low resolution part is in a read-only state while the high resolution part is unable to be read.

It is to be noted that the types of attributes of the file included in the main header are a "normal state" which allows both editing and reading of the file; and a "lock state" which allows reading of the file but prohibits editing of the file, and also prevents other processes (e.g., display, or printing) from being performed on a file that is in the midst of an editing process.

The CPU 11 of the server computer 2 includes an informing unit that, subsequent to the aforementioned processes, informs the completion of the image editing process (e.g., erasing, noise removal, or skew correction with respect to a rectangular region) for the prescribed image file to the client computer 4 (Step T8). At this stage, the image editing process is not performed on all resolutions, as only the image editing process of the low resolution part is completed.

After the client computer 4 receives a notification informing of the completion of the image editing process for the prescribed image file ("YES" in Step S3), the completion of the image editing process for the prescribed image file is informed by displaying in the display unit 19 or by outputting to the image output device 6 (e.g. printer) or the MFP 7 (Step S4).

The asynchronous processing part of the server computer 2, which is inserted with the editing job for the high resolution part of the image, performs an image editing process for the high resolution part at a prescribed timing such as during the night. The asynchronous process is performed in a queue. More specifically, when the CPU 11 of the server computer 2 detects insertion of the editing job at a prescribed timing, such as during the night ("YES" in Step P1), the editing job inserted in queue is then processed in sequence. That is, an editing command is read from the editing job (Step P2), then the compressed data for the high resolution part of the image is extracted from the prescribed image file stored in the HDD 15 (Step P3), then the compressed data is subjected to a decompression process (decoding process) in accordance with the JPEG 2000 algorithm (Step P4), then an editing process (e.g., erasing, noise removal, or skew correction with respect to a rectangular region) is performed on the image generated from the decompression process (Step P5), and then a compression process is performed in accordance with the JPEG 2000 algorithm (Step P6). The time of the image editing process will usually be longer than that for the low resolution part owing that the amount of data will usually be larger.

In other words, editing results for the low resolution part can be quickly provided to the client computer 4 while the image editing process for the high resolution part, which may require a longer editing time, can be performed at a prescribed timing during an asynchronous process (background process) of the server computer 2, by separately performing the image editing process for the low resolution part and the high resolution part in response to the command from the client computer 4. Accordingly, a stress-free operability can be provided for the user.

Subsequently, the CPU 11 of the server computer 2 changes the attribute of the file included in the main header into the "normal state" (Step P7). In this stage, the image editing processes for both the low resolution part and the high resolution part are completed.

The server computer 2 includes a second editing unit which refers to that portion of the CPU 11 of the server computer 2 that performs the functions of the aforementioned steps P2 through P7.

In consequence, when the server computer 2 receives an image editing command from the client computer 4, the image editing process in response to the command is performed only for the low resolution part of the image data, then completion of the image editing process is informed to the client computer 4, and then the image editing process for the high resolution part of the image data is performed asynchronously at a prescribed timing, such as during the night. Accordingly, since the image editing process for the low resolution part having a little amount of data can be performed in a shorter amount of time compared to editing the entire image data, the image editing process may be faster than the conventional image editing process. Therefore, waiting time for the user during the image editing process can be shortened.

Next, an image display process performed after the informing of the completion of the image editing process of the prescribed image file is described.

Figure 13:
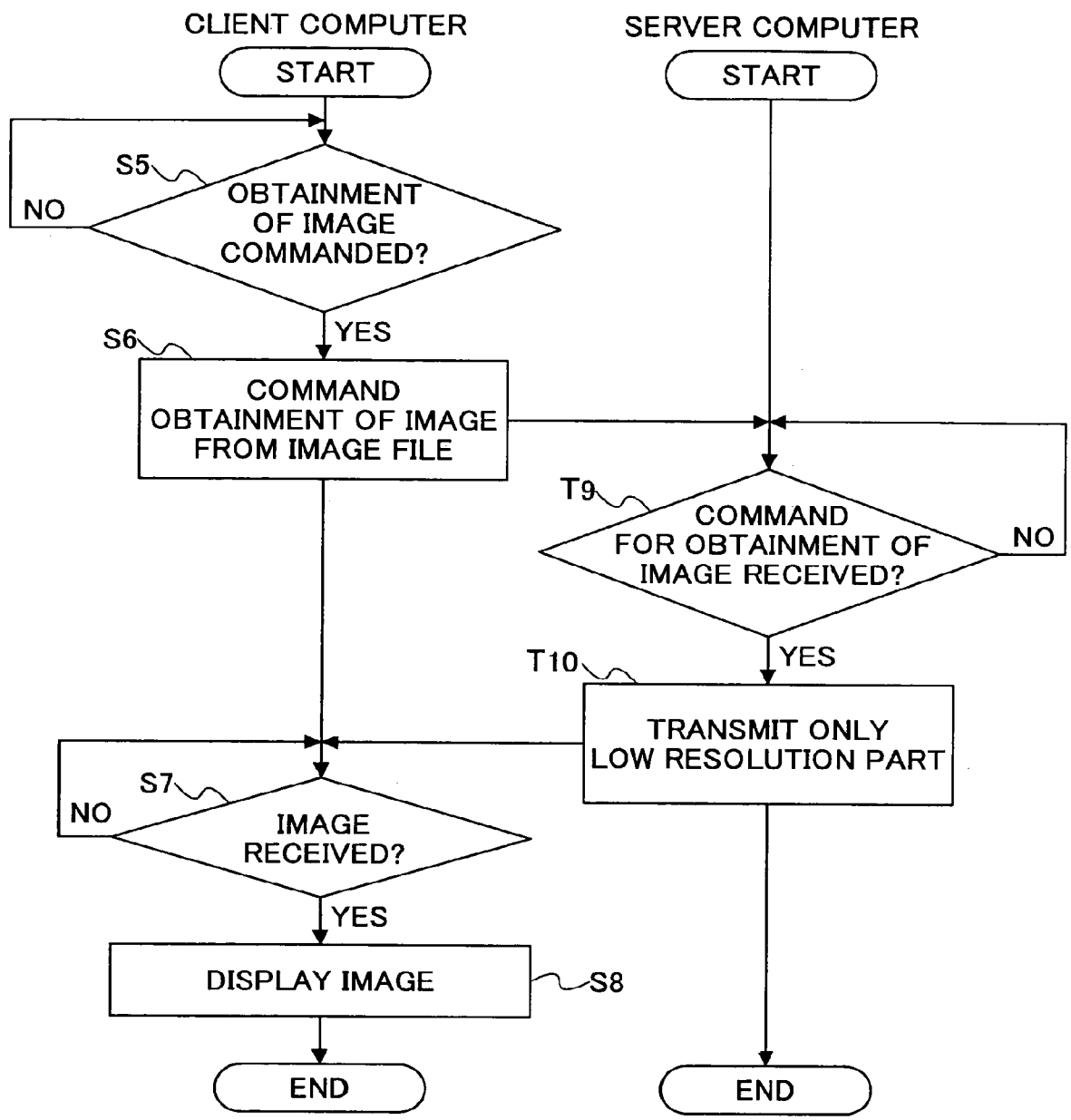
FIG. 13 is a flowchart showing a flow of an image display process.

FIG. 13 is a flowchart showing a flow of an image display process performed by the server computer 2 (i.e. image processing apparatus) and the client computer 4 (i.e. image processing apparatus). In the client computer 4, in a case where the operator (user operating the client computer 4) commands retrieval of an image aimed for display (whole image for display) in a prescribed image file by using the keyboard 20 or the pointing device 21 ("YES" in Step S5), a signal commanding retrieval of the image aimed for display (whole image for display) in the prescribed image file is transmitted to the server computer 2 (Step S6).

When the server computer 2 receives the signal commanding retrieval of the image aimed for display (whole image for display) in the prescribed image file ("YES" in Step T9), compressed data of a low resolution part of the image, which is extracted from the prescribed image file stored in the HDD 15, is transmitted to the client computer 4 (Step T10). It is to be noted that, the state of the file (attribute of the file) during this stage includes a "normal state" and a "low resolution edited state". In either state, the editing result for the low resolution part is available. Therefore, by transmitting the low resolution part to the client computer 4, the client computer 4 can reliably obtain an edited image 8 (at least for the low resolution part of the image).

After the client computer 4 receives compressed data of the low resolution part of the image in the prescribed image file edited image from the server computer 2 ("YES" in Step S7), the compressed data is subjected to a decompression process (decoding process) in accordance with the JPEG 2000 algorithm, and the image generated from the decompression process is displayed in the display apparatus 19 (Step S8).

Accordingly, since the image editing process in response to the image editing command from the client computer 4 is provided, at least for the low resolution part, the client computer 4 can reliably obtain an edited image for the low resolution part by the transmittal of the low resolution part.

In one embodiment, the image editing process is first performed on the low resolution part (e.g., erasing, noise removal, or skew correction with respect to a rectangular region), and then the image editing process is performed asynchronously on the high resolution part. That is, the low resolution part and the high resolution part temporarily become different images. Nevertheless, when the entire display, which uses the low resolution part (reduced display for allowing the entire image to be viewed on a display), is switched to a partial display, which uses the high resolution part (equal-sized or enlarged display for allowing a portion of an image to be viewed), an inconsistency in the displayed images is caused in a case where the asynchronous editing job of the high resolution part is not completed.

Therefore, when a portion of an image using the high resolution part is commanded to be displayed in a case where the asynchronous job is not completed, the image editing process is performed only on the portion (e.g. tiles) of the image using the high resolution part of the image, and then the compressed data for the portion of the image using the high resolution part of the image is transmitted to the client computer. The portion (tiles) subjected to the image editing process is employed when performing the asynchronous job for editing the entire high resolution part of the image.

Therefore, for example, when an entire display using the low resolution part is switched to a partial display, no inconsistency between the displayed images will occur.

Among image editing processes, there are those that allow a portion of an image to be replaced on a tile-by-tile basis, and those that require an entire image to be decoded and then compressed again. For example, although a process of flipping may be performed on a tile-by-tile basis, a process of skew correction requires decoding of an entire image.

Therefore, when a portion of an image using a high resolution part (a portion of an image to be viewed in equal-size or enlarged size) is commanded to be displayed in a case where the asynchronous job of editing the high resolution part is not completed, the client computer 4 is informed that the commanded portion of the image cannot be displayed when an image editing process, which cannot be performed on a portion (e.g., tile) by portion (e.g., tile) basis, is being performed.

Accordingly, in a case where an image editing process (e.g., skew correction), which is unable to be performed on a tile-by-tile basis, is being performed, the display of the portion of the image is cancelled.

Furthermore, in performing a printing process using the high resolution part based on a display image using the low resolution part, an inconsistency between the displayed image and the printed image is caused when the asynchronous job of editing the high resolution part is not completed.

Therefore, in a case where a command to print the high resolution part is given where the asynchronous job is not completed, the client computer 4 is informed that the commanded printing process cannot be conducted.

Accordingly, in a case where the printing process using the high resolution part based on the display image using the low resolution part is performed, the problem of printing an image that is inconsistent with the display image can be prevented.

Further, the present invention is not limited to these embodiments, but various variations and modifications may be made without departing from the scope of the present invention.

The present application is based on Japanese priority application No. 2002-361797 filed on Dec. 13, 2002, with the Japanese Patent Office, the entire contents of which are hereby incorporated by reference.

What is claimed is

1. A server connected to a client via a network for editing image data based on image editing commands from the client, the server comprising:
   a storing unit to store image files;
   a first image editing unit to edit a low resolution part of an image file stored in the storing unit in synchronization with receiving an image editing command from the client;
   an informing unit to inform the client other that the image editing process has been completed by the first image editing unit;
   a job supplying unit to form a job commanding a high resolution part of the image file stored in the storing unit to be edited and to insert the job in a queue; and
   a second image editing unit to conduct a background process at a prescribed timing to edit the high resolution part of the image file stored in the storing unit with respect to the received image editing command from the client in accordance with the job inserted in the queue by the job supplying unit;

wherein the editing of the high and low resolution parts of the image file are conducted separately;

wherein when the client commands display of a part of the image file using the high resolution part in a case where the background process is not completed, the second image editing unit is operable to edit only the high resolution part corresponding to the part of the image file;

wherein the second image editing unit is operable to transmit the edited image file to the client.

2. The server as claimed in claim 1, wherein when the client commands the image file to be displayed, encoded data of the edited low resolution part of the image file is transmitted to the client.

3. The server as claimed in claim 1, wherein when the client commands a portion of the high resolution part of the image file to be displayed in a case where the second image editing unit has not completed editing the high resolution part of the image file, the portion of the high resolution part of the image file is edited, and the edited portion of the high resolution part of the image file is encoded and transmitted to the client.

4. The server as claimed in claim 3, wherein the client is informed that the portion of the high resolution part of the image file cannot be displayed when the image editing process that is being conducted is an image editing process that cannot be conducted on a portion by portion basis.

5. The server as claimed in claim 1, wherein when the client commands a printing process to be conducted for the image file including the high resolution part of the image file, in a case where the second image editing unit has not completed editing the high resolution part of the image file, the client is informed that the printing process cannot be conducted.

6. An image editing method used with an server image connected to a client via a network for editing image data based on image editing commands from the client, the image editing method comprising:

storing an image file;

editing a low resolution part of an the stored image file in synchronization with receiving an image editing command from the client;

informing the client that the image editing process has been completed;

forming a job commanding a high resolution part of the image to be edited;

inserting the job in a queue; and conducting a background process at a prescribed timing to edit the high resolution part of the image with respect to the received image editing command from the client in accordance with the job inserted in the queue; and transmitting an edited image file to the client;

wherein the editing of the high and low resolution parts of the image file are conducted separately; and wherein when the client commands display of a part of the image file using the high resolution part in a case where the background process is not completed, only the high resolution part corresponding to the part of the image file is edited.

7. An article of manufacture having one or more recordable storage media storing instructions thereon which, when executed by a computer having server, where the server is in communication with a client via a network, cause the computer to:

storing an image file;

editing a low resolution part of an the stored image file in synchronization with receiving an image editing command from the client;

informing the client that the image editing process has been completed by the image editing function;

forming a job commanding a high resolution part of the image file to be edited;

inserting the job in a queue; and conducting a background process at a prescribed timing to edit the high resolution part of the image file with respect to the received image editing command from the client in accordance with the job inserted in the queue by the job inserting function; and transmitting an edited image file to the client wherein the editing of the high and low resolution parts of the image file are conducted separately;

wherein when the client commands display of a part of the image file using the high resolution part in a case where the background process is not completed, only the high resolution part corresponding to the part of the image file is edited.

8. The article of manufacture as claimed in claim 7, wherein when the client commands the image file to be displayed, encoded data of the edited low resolution part of the image file is transmitted to the client.

9. The article of manufacture as claimed in claim 7, wherein when the client commands a portion of the high resolution part of the image file to be displayed in a case where the second image editing function has not completed editing the high resolution part of the image file, the portion of the high resolution part of the image file is edited, and the edited portion of the high resolution part of the image file is encoded and transmitted to the client.

10. The article of manufacture as claimed in claim 9, wherein the file is informed that the portion of the high resolution part of the image file cannot be displayed when the image editing process that is being conducted is an image editing process that cannot be conducted on a portion by portion basis.

11. The article of manufacture as claimed in claim 7, wherein when the client commands a printing process to be conducted for the image file including the high resolution part of the image file, in a case where the second image editing function has not completed editing the high resolution part of the image, the client is informed that the printing process cannot be conducted.

* * * * *